Inventors
Fritz Fronza
Ulrich Pfaffenhardt

May 23, 1967  F. FRONZA ETAL  3,320,642
APPARATUS FOR STORING AN ELONGATED FLEXIBLE ELEMENT
Filed April 26, 1965  8 Sheets-Sheet 3

Inventors
Fritz Fronza
Ulrich Pfottenhardt
by Michael J. Striker
Atty

May 23, 1967 F. FRONZA ETAL 3,320,642
APPARATUS FOR STORING AN ELONGATED FLEXIBLE ELEMENT
Filed April 26, 1965

Inventors
Fritz Fronza
Ulrich Plotthardt
by Michael J. Striker
Attorney

May 23, 1967  F. FRONZA ETAL  3,320,642
APPARATUS FOR STORING AN ELONGATED FLEXIBLE ELEMENT
Filed April 26, 1965  8 Sheets-Sheet 7

Inventors
Fritz Fronza
Ulrich Pfaffenlader
by Michael J. Striker
Atty.

May 23, 1967  F. FRONZA ETAL  3,320,642
APPARATUS FOR STORING AN ELONGATED FLEXIBLE ELEMENT
Filed April 26, 1965  8 Sheets-Sheet 8

Inventors
Fritz Fronza
Ulrich Plankenhardt
by Michael J. Striker

United States Patent Office 3,320,642
Patented May 23, 1967

3,320,642
APPARATUS FOR STORING AN ELONGATED
FLEXIBLE ELEMENT
Fritz Fronza, Kongen, and Ulrich Plattenhardt, Ebersbach (Fils), Germany, assignors to Zinser-Textilmaschinen GmbH, Ebersbach (Fils), Germany
Filed Apr. 26, 1965, Ser. No. 450,747
Claims priority, application Germany, Apr. 28, 1964,
Z 10,804
27 Claims. (Cl. 19—159)

The present invention relates to an apparatus for storing an elongated flexible element, and more particularly to apparatus facilitating the connecting of the separated ends of a broken elongated flexible element which is being stored during a continuous storing operation.

Storing devices for continuously storing a sliver, slubbing, roving or the like are known which provide a tubular storing member into whose lower end the elongated flexible element is fed through guide means on a pair of eccentric rotary members. Such an apparatus is described in the copending U.S. patent application Ser. No. 363,673.

The flexible element is transported out of the upper end of the tubular storing member, so that differences between the input speed and the output speed can be compensated by the part of the flexible element stored in the tubular storing member.

Apparatus of this type has the disadvantage that it is very difficult to connect the separated ends of the flexible element when the same breaks. It is necessary to insert the broken off end of the stored part of the flexible element into a guide means on a rotary support member, and it is even more difficult to insert the other broken end from a position below the rotary support member into the guide means of the same. Access to the underside of the rotary support and guide member of the flexible element is particularly difficult since the same is preferably arranged near the floor to reduce the height of the apparatus. Furthermore, the rotary support and guide means runs in some machines at such a high speed, that it is practically impossible to insert the ends of the broken flexible element into the guide means of the rotary support guide member during rotation of the same.

It is one object of the invention to overcome the disadvantages of storing apparatus in which a rotary support and guide member inserts a transported flexible element into the lower end of a tubular storing member, and to provide an apparatus of this type, which facilitates the connecting and tying together of the ends of the flexible element if the same breaks while being transported and stored.

Another object of the invention is to provide a construction which renders the guide means through which the flexible element is transported accessible to the operator of the machine.

Another object of the invention is to provide a motor independently of the drive means of the apparatus for rotating transporting rollers in a direction opposite to the normal transporting direction so that the broken end is inserted by the transporting rollers into a guide means.

In accordance with the invention, the drive of the transporting means by which the flexible element is transported into the storing member, is stopped whereupon the storing member is moved to an inoperative position spaced from the rotary support and guide means so that the ends of the flexible element can be located in the lower region of the tubular storing member, and inserted into the guide means. When in this condition, the transporting rollers of the apparatus are rotated in a direction opposite to the normal direction, the broken off end of the flexible element is inserted into other guide means through which it normally passes during the storing operation before reaching the transporting rollers.

After a drive of the apparatus has been stopped, the transporting rollers can be turned in a direction opposite to the normal transporting direction either manually, or by a special motor.

In the preferred embodiment of the invention, the drive of the storing apparatus is automatically stopped when the flexible element breaks while being transported into the storing member. A feeler senses the condition of the flexible element, and actuates a clutch to interrupt the drive of the apparatus. Preferably, the clutch cooperates with a brake which immediately brakes the rotary parts of the apparatus when a breakage occurs, and the clutch is shifted to a disengaged position. Due to the fact that the rotary support and guide means is rapidly stopped in this manner when a breakage occurs, the broken off end of the flexible element may still be in a position held by the transporting rollers, so that the broken off end portion can be drawn out of the storing member by rotating the transporting rollers in a direction opposite to the normal transporting direction. While the clutch is preferably automatically operated, it is manually shifted to the engaged position for continuing the storing operation after the separated ends of the broken flexible element are again connected to each other.

If the broken off end portion is no longer located between the transporting rollers, but in the tubular storing member, it is necessary to move the storing member to an inoperative position in which the guide means of the rotary support and guide means is accessible. The tubular storing member may be turned about a vertical axis, about a horizontal axis, or shifted in a translatory movement to the inoperative position.

In a modified embodiment of the invention, a preferably transparent cover plate covers the lower open end of the tubular storing member, and is manually movable to an open position in which the operator has access to the lower end of the tubular storing member in its inoperative position. The cover member is preferably provided with slots through which the flexible element passes.

Another modified construction of the invention provides a storing member which is composed of two axially spaced rings which are connected to each other by a plurality of circumferentially spaced rods resulting in a cage-like structure permitting access to the coiled and stored flexible element therein.

In the preferred embodiment of the invention the rotary support and guide means include a first rotary member, and a second rotary member mounted on the first rotary member for turning movement about an axis eccentric to the axis of rotation of the first rotary member, and the second rotary member is provided with guide means for the flexible element and carries the transporting rollers by which the same is transported into the tubular storing member since the second rotary member revolves with the first rotary member about the axis of the same. The motor by which the transporting rollers are driven in a reversed direction, as explained above, is connected to the drive of the transporting rollers by expansible and contractable transmission means so that the driving connection is maintained in all positions of the eccentric second rotary member.

In accordance with one aspect of the invention, the guide means for the flexible element are provided with a slot-shaped enlargement whose length increases in the direction of the movement of the transported flexible element, while its width is reduced in the same direction. Even if the guide means is ring-shaped, it is preferred that the guide opening gradually widens in transporting direction of the flexible element.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 9 is a front view, FIG. 10 is a plan view.

FIG. 12 is a front view, FIG. 13 is a plan view.

FIG. 16 is an elevation, FIG. 17 is a bottom view.

Figure 1:
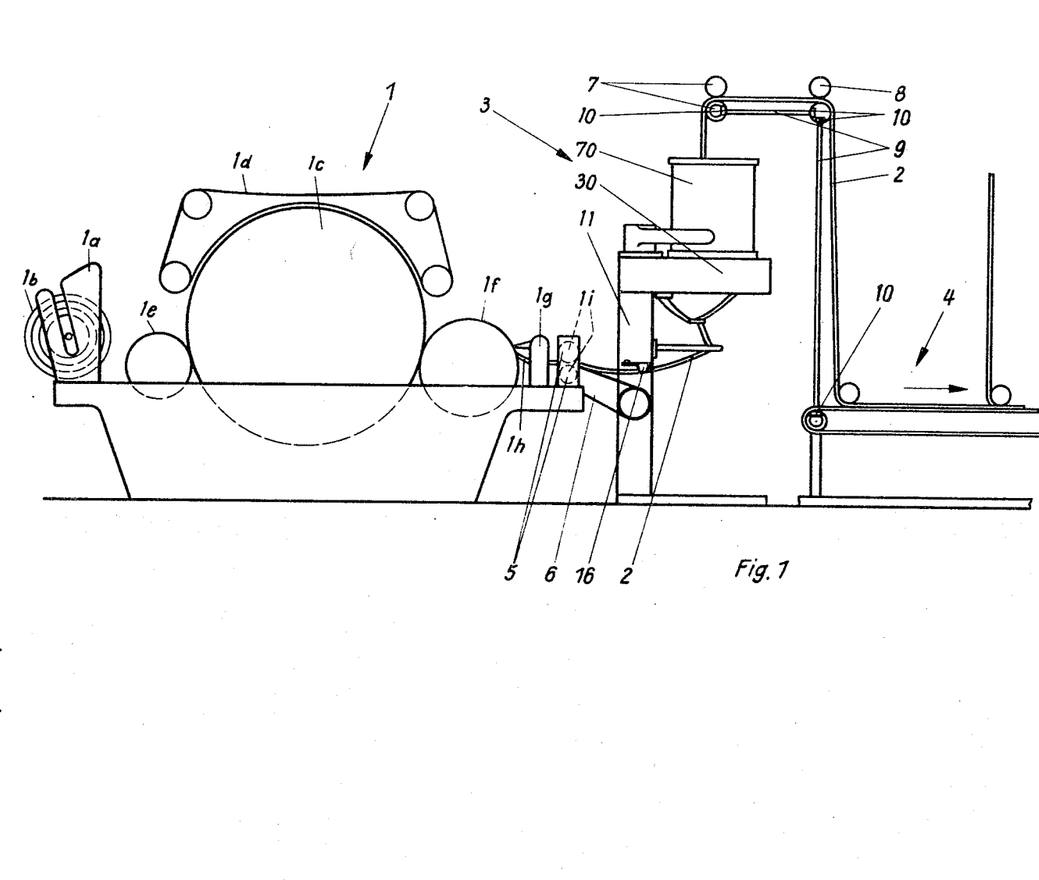
FIG. 1 is a fragmentary schematic view illustrating a storing device according to the invention following a carding apparatus.

Referring now to the drawings, and more particularly to FIG. 1 illustrating an arrangement in which the apparatus of the invention is used, a carding machine 1 delivers in a known manner a rope consisting of fibers, such as a sliver or roving which will be hereinafter referred to as an elongated flexible element. The carding machine has a reeling device 1a on which a material 1b is wound. A portion of the periphery of a carding drum 1c is embraced by a carding chain 1d which is guided in an endless loop about guide rollers. A preliminary tearing roller 1e cooperates with the carding drum. A doffing means 1f follows carding drum 1c and delivers the flexible element 2 to a hacking device 1h driven by device 1g from where the flexible element 2 passes to a storing device generally indicated at 3. The flexible element is supplied into the lower end of a tubular storing member 70, and drawn out of the upper end of the same by transporting rollers 7 and 8. In this region, the flexible element must be transported at the speed of a conveyer 4. Transporting rollers 7 and 8 are driven by shafts 9 and bevel gears 10 from the drive means of conveyer band 4. The storing device receives the flexible element transported by pressing feeding rollers 5 at substantially the same speed as the flexible element is transported by conveyer 4, but since variations of the speed occur, particularly in the speed of the supplied flexible element, a length of the flexible element is stored in the hollow storing member 70 to compensate variations of the input and output speed of the flexible element. The flexible elements delivered by at least two and generally more than eight carding machines are collected by one conveyer means 4 and removed at the same speed. The tubular storing members 70 of the several storing devices contain a sufficient length of the flexible element to supply the flexible element to conveyer means 4 if one or several carding machines deliver a flexible element at a reduced speed, or temporarily stop delivery.

Evidently, the storing operation of the apparatus of the invention may be applicable to other apparatus in which a flexible element is delivered by one machine, and taken up by another machine at speeds which may vary during the operation.

Another modification of the independent drive of gear ring 46, not illustrated, provides a worm gear ring instead of the chain teeth 48 on gear ring 46, meshing with a worm mounted in rotary member 27, 28, 29 and rotatable by a hand crank mounted on the lower plate 37. In this construction, the worm gearing is self-locking so that gear ring 46 revolves with rotary member 27, 28, 29. In this construction, the rotation of the transporting rollers 44 is derived from the rotary movement of the inner rotary member 38 in the outer rotary member 26, 27, 29.

Referring again to FIG. 3, the bevel gear 45 is mounted on a shaft 62 journalled in the inner rotary member 38. The other end of shaft 62 drives a pair of meshing bevel gears 63 which rotate the pair of transporting rollers 44 through a gear train including three spur gears 65.

Figure 4:
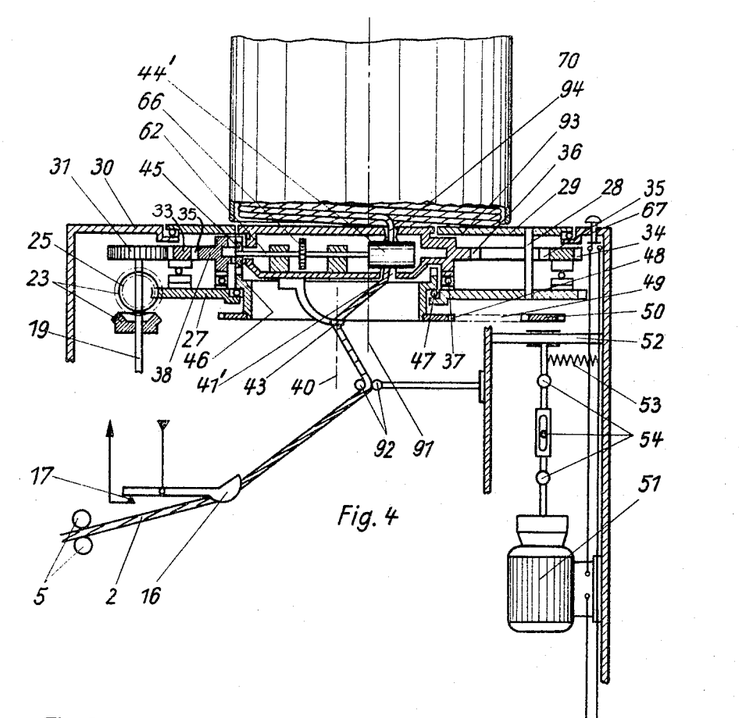
FIG. 4 is a fragmentary sectional view illustrating a modified embodiment of the invention.

In the embodiment of FIG. 4, shaft 62 carries one of the transporting rollers 44', and a spur gear 66 which transmits the rotary movement by gears, not shown, to the other transporting roller. A pair of transporting rollers 44' is disposed so that the middle portion of the transporting rollers where the flexible element is transported, is located directly over the guide means 41'.

Figure 2:
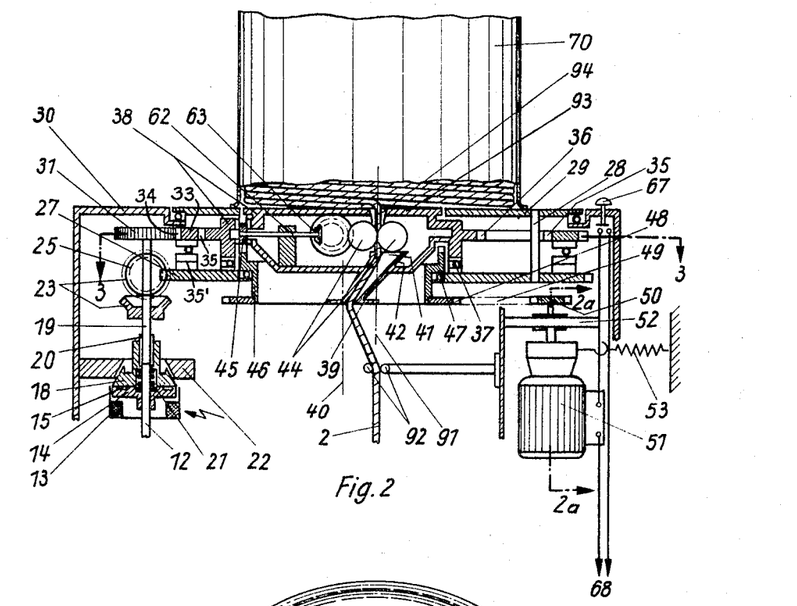
FIG. 2 is a fragmentary longitudinal section illustrating one embodiment of the invention.

Channel 42 of the embodiment of FIG. 2 is shown in greater detail in FIGS. 20 to 24. The upper guide opening 41 has a cross section different from the generally cylindrical cross section of the major portion of channel 42. A narrow, slot-like recessed portion of guide opening 42 is continued into the channel and is shaped in such a manner that the length of the recess is gradually reduced, while its width is gradually increased as apparent from the cross sections shown in FIGS. 22, 23 and 24.

Figure 5:
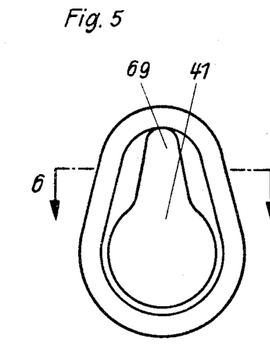
FIG. 5 is a fragmentary bottom view of a detail of the embodiment of FIG. 4.
Figure 6:
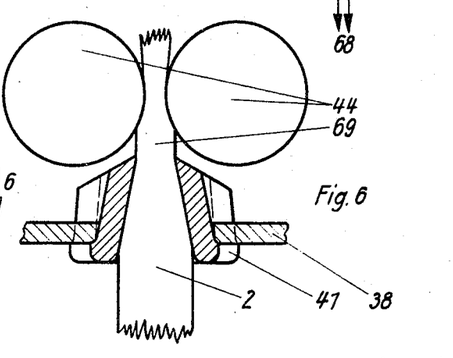
FIG. 6 is a fragmentary sectional view taken on line 6—6 in FIG. 5 and illustrating transporting rollers.

In the embodiment of FIG. 4, the guide means 41' is substantially an annular guide member which is preferably constructed as shown in FIGS. 5 and 6.

The channel widens only in a direction opposite to the transporting direction of the flexible element 2, but its transverse extension remains the same. In any event, the slot-like portion 69 of the guide channel is directed toward the axis of rotation 40 of the inner rotary member 38 where a guide means in the form of an eyelet 43 is located. Guide means 43 is secured to the inner rotary member and revolves with the same about axis 91.

Figure 3:
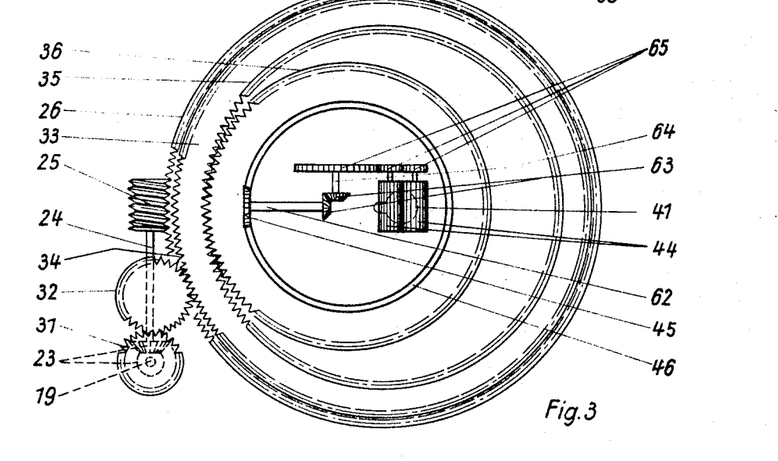
FIG. 3 is a horizontal sectional view taken on line 3—3 in FIG. 2, and schematically illustrating the drive of the apparatus.
Figure 9:
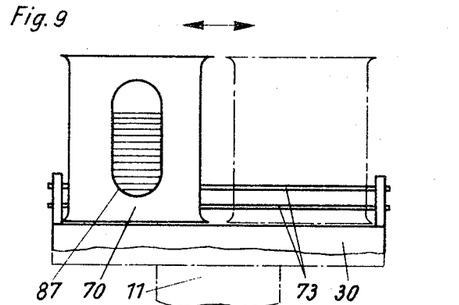
Figure 10:
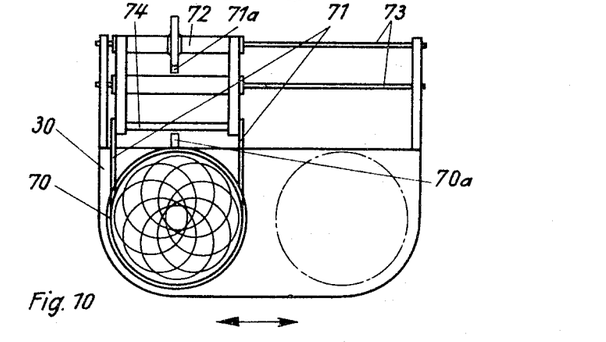
Figure 11:
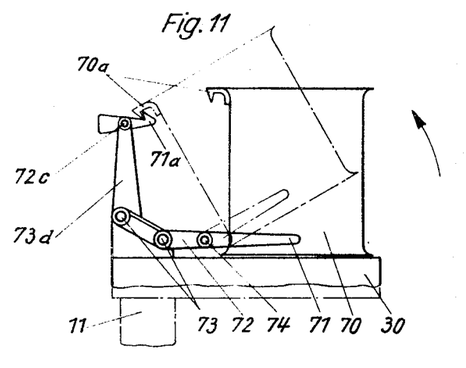
FIG. 11 is a side view illustrating an embodiment of the tubular storing member and of mounting means for the same.

In the embodiment of FIGS. 2 to 4, the inner rotary member 38 has a top plate 93 forming with top plate 29 of the outer rotary member a top surface above which the tubular storing member 70 is disposed. In the embodiment of FIGS. 9–11, storing member 70 is supported by two arms 71 on a slide 72 which is movable along a pair of guide rails 73 together with tubular storing member 70 between the operative position shown in solid lines, and a displaced inoperative position shown in broken lines. Arms 71 are mounted in such a manner on slide 72 that the tubular storing member 70 can be tilted about shaft 74 so that the lower open end thereof is accessible. In the tilted position, a hook-shaped member 70a snaps into a gravity operated arresting catch 71a which is turnable about a pin 72c on a support bracket 73d. Members 70a, 71a hold tubular member 70 in the tilted position while the operator removes a broken end of a flexible element stored therein.

Figure 12:
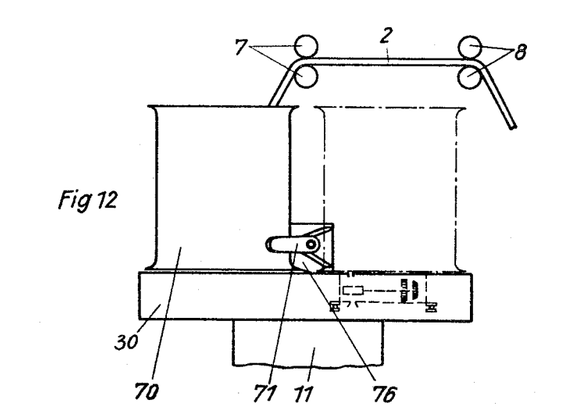
Figure 13:
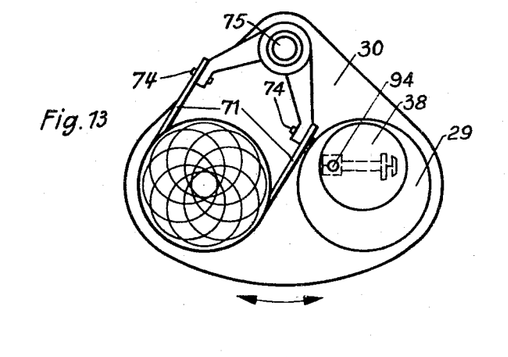
Figure 14:
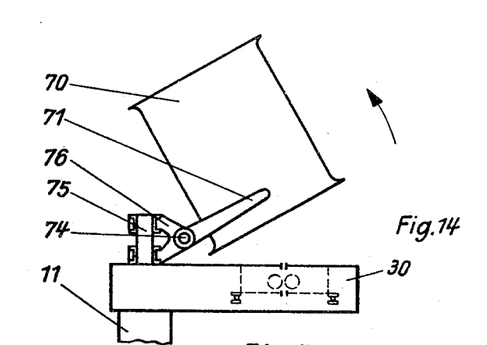
FIG. 14 is a side view of another embodiment of the tubular storing member and the mounting of the same.

In the embodiment of FIGS. 12 to 14, arms 71 of storing member 70 are tiltable about shafts 74 which are supported on a carrier member 76 mounted on a vertical column or shaft 75 for turning movement about a vertical axis between the operative position shown in solid lines and the inoperative position shown in broken lines in FIG. 12. In the embodiments illustrated in FIGS. 9 to 14, the top surface of the storing apparatus has such a length that the storing member 70 can be removed from the top surface of the rotary members 29 and 38, with the lower end of storing member moving parallel to the table surface so that a coil of the flexible element stored in storing member 70 cannot drop out of the same. In the position of FIG. 13, storing member 70 is in an inoperative position spaced from the rotary members 29 and 38. In the position of FIG. 10, for example, storing member 70 is located directly above the top face of rotary members 29 and 38. When the end of a broken flexible element is to be located by the operator, the storing member 70 is tilted to the position of FIG. 14, while the stored coil is manually held.

Figure 15:
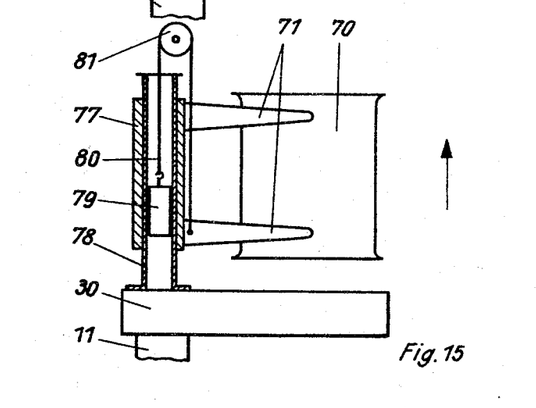
FIG. 15 is a side view, partially in section, illustrating another embodiment of the mounting means of the tubular storing member.

In the embodiment of FIG. 15, the arms 71 of storing member 70 are secured to a tubular slide 77 which is mounted on a shaft or column 78 for movement in vertical direction toward and away from the top surface of the annular table 30 and of the rotary members 38 and 29. Tubular slide 77 is prevented from rotation about shaft 78 by a suitable key. In the illustrated inoperative position of tubular storing member 70, the operator can grasp the broken off end of a flexible element stored in storing member 70 since the lower end of storing member 70 is sufficiently spaced from the top surface of the table.

Weight means 79 are connected to a rope 80 which is guided over a roller 81 and secured to the arms 71 so that the weight of storing member 70 is compensated in all displaced positions and little force is required for raising and lowering storing member 70. Counterweights of this type can also be provided in the construction of FIGS. 16 to 18, and are shown at 79.

Figure 16:
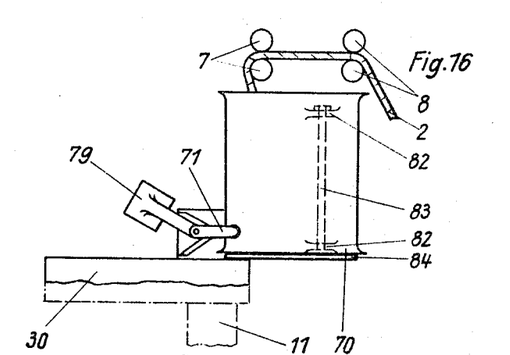
Figure 17:
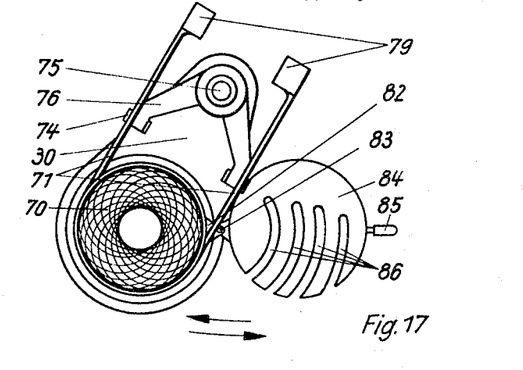
Figure 18:
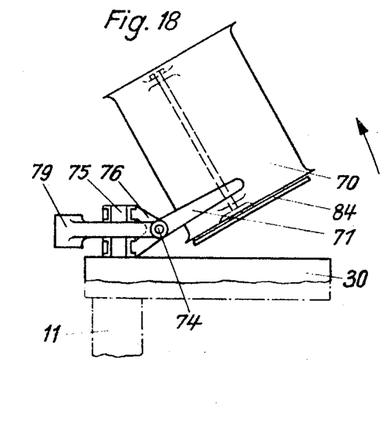
FIG. 18 is another elevation illustrating different operational positions of another embodiment of the storing member and of the mounting means thereof.

The construction illustrated in FIGS. 16 to 18 provides a cover member 84 which is mounted on a shaft 83 supported on bearings 82 on storing member 70. A handle on cover member 84 permits the movement of the cover member to the position shown in FIG. 17 in which the lower end of the tubular storing member is open and accessible. Slots 86 are preferably provided in the cover member and are curved with the center line at the axis of shaft 83 so that the end of the flexible element can pass through one of the slots 86 when the cover member is moved to the closed position. Preferably, cover member 84 is made of a transparent synthetic plastic material.

As in the embodiment of FIGS. 12 to 14, arms 71 support the storing member on a turnable carrier member 76, and the storing member is mounted for tilting movement about shaft means 74. Weights 79 counterbalance storing member 70 in the tilted inoperative positions.

Figure 19:
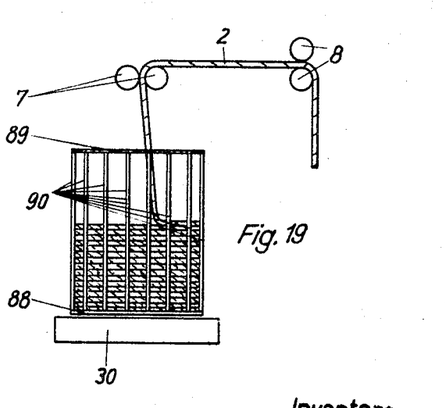
FIG. 19 is an elevation illustrating another embodiment of the storing member.
Figure 20:
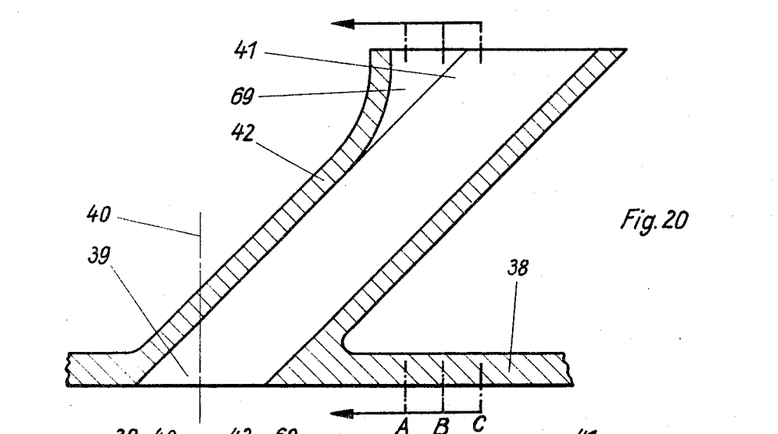
FIG. 20 is a fragmentary sectional view illustrating on a larger scale a detail of the apparatus shown in FIG. 2.
Figure 21:
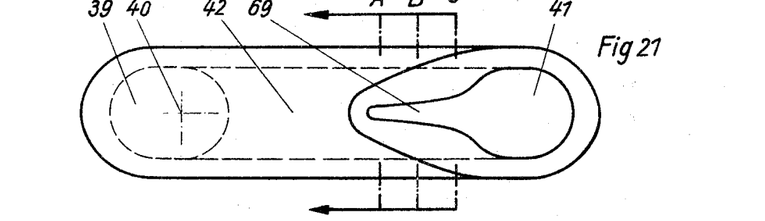
FIG. 21 is a plan view of the structure shown in FIG. 20.
Figure 22:
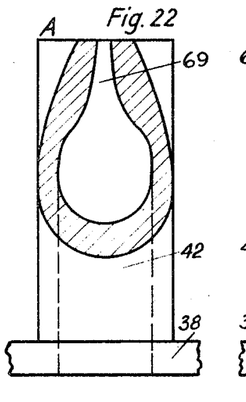
FIGS. 22, 23, and 24 are sectional views taken on lines A—A, B—B, and C—C in FIGS. 20 and 21.
Figures 23, 24:
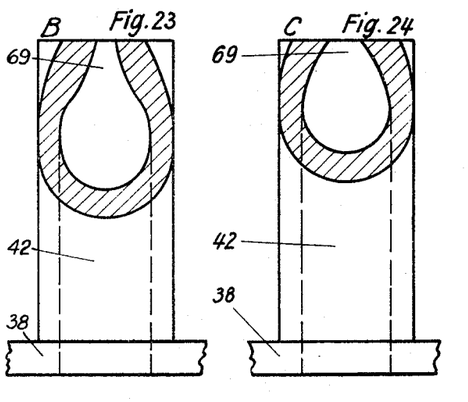

As shown in FIG. 9, windows 87 are advantageously provided in the storing member permitting the observation of the height of the coil of the flexible element stored in storing member 70. FIG. 19 illustrates an embodiment of a storing member which is composed of an upper ring 89, a lower ring 88, and axially extending circumferentially spaced connecting rods secured to the rings. This cage-like structure permits easy access to the flexible element coiled in the storing member.

The drive of the storing apparatus 3 is derived from the carding machine. For example, a chain 6 is driven by a shaft of the carding machine and drives through a transmission, not shown, a vertical shaft 12 mounted in the support column 11 of the storing apparatus. Referring now to FIGS. 2 and 3, a clutch provided at the upper end of the drive shaft 12 is movable to a coupling position for connecting a shaft 19 with drive shaft 12. An electromagnetic clutch including a winding 13, and a coupling member 14 provided with covers 15 is illustrated, but a mechanical coupling may also be used. The winding 13 is energized, and the clutch is moved from a disengaged position to an engaged position in which it remains as long as a feeler means 16, see FIG. 4, senses the flexible element 2 between the pair of rollers 5 of the carding machine, and a guide means 92. The feeler arrangement is omitted in FIG. 2 for the sake of simplicity. The transported flexible element 2 holds feeler means 16 in a position closing a pair of contacts 17 by which the winding 13 is connected to a source of voltage. The energized winding 13 moves the armature member 18 toward the coupling member 14 which is mounted on shaft 19 for axial movement, but is connected to shaft 19 by a key means 20 for rotation therewith.

When the clutch is energized and in the engaged position, shaft portion 19 is rotated by shaft portion 12, but when the clutch is de-energized, a compression spring 21 abutting on coupling member 14 moves armature plate 18 to a position in which a frustoconical surface of plate 18 is pressed against a corresponding frustoconical inner surface of a fixed brake member 22 so that shaft 19 is momentarily stopped together with the elements driven thereby which will now be described.

The rotary motion of shaft 19 is transmitted by a pair of bevel gears 23, a shaft 24, see FIG. 3, and a worm 25, to a gear ring on the outer periphery of a circular plate 27 which is connected by a plurality of circumferentially spaced bolts, of which only one is shown in FIG. 2, to a circular plate 29. Members 27, 28, 29 form a rotary member which is mounted for rotation in an annular member 30 of the supporting frame of the machine by means of ball bearings. Rotary member 27, 28, 29 rotates about an axis 91, which is also the axis of a tubular storing member 70 whose lower open end is disposed directly above the top face of plate 29.

A gear 31 fixed to shaft 19 meshes with an intermediate gear 32, see FIG. 3, which meshes with a gear crown 34 on the outer circular periphery of a ring 33 which is also mounted on bearing means 35' on annular plate 27 for rotation about axis 91, and has an inner circular gear crown 35. Gear crown 35 meshes with a gear ring 36 on the outer circular periphery of a smaller second rotary member 38 which is mounted on bearing means 37 on rotary member 27, 28, 29 for rotation about an axis 40 which is parallel to axis 91 so that rotary member 38 has an eccentric position in relation to rotary member 27, 28, 29. The inner rotary member 38 has guide means for the flexible element 2, including a guide means 39 at its center where axis 40 is located and, as best seen in FIG. 4, another guide means 41, preferably substantially in the region of the axis 91. In the embodiment of FIG. 2, guide means 39 and 41 are connected by a channel 42 which is slanted to the direction of axis 40 and axis 92. The flexible element 2 is supplied from a position below the rotary members through guide openings 39 and 41 to a pair of transporting rollers 44 which deliver the flexible element to a frustoconical guide member 94 in the upper plate 93 of the inner rotary member 38.

Transporting rollers 44 are urged toward each other by springs, not shown, and are driven from a bevel gear 45 which meshes with a gear ring 46. Gear ring 46 is mounted on bearing means 47 for turning movement about an axis coinciding with axis 40 of the inner rotary member 38. As illustrated, the bearing is provided on plate 27, but it could also be mounted on rotary member 38.

Figure 2A:
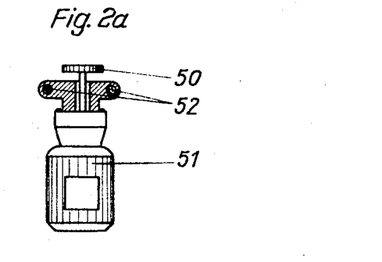
FIG. 2a is a sectional view taken on line 2a—2a in FIG. 2.

Gear ring 46 has teeth 48 engaged by an endless chain 49 passing over a chain wheel 50. As shown in FIGS. 2 and 2a, chain wheel 50 is secured to the shaft of an electric motor 51 which is mounted for movement along guide means 52 in the form of a pair of guide rails. A spring 53 between motor 51 and a fixed frame part of the machine, urges motor 51 to a position in which chain 49 is tensioned, even during movement of gear ring 46 toward and away from motor 51 while gear ring 46 revolves with the rotary member 27, 28, 29 about axis 91. In the embodiment of FIG. 4, the motor 51 is secured to a frame part of the machine, and only chain wheel 50 is mounted for translatory movement on guide means 52. A flexible shaft 54, provided with universal joints, connects the motor shaft with the shaft portion carrying chain wheel 50, so that the latter can be displaced and follow the movement of gear ring 46 with the inner rotary member 38.

Figure 7:
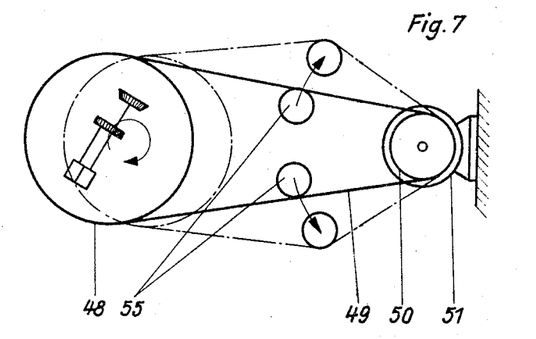
FIG. 7 is a fragmentary plan view illustrating an expansible and contractable transmission used in the apparatus of the invention.

Another expansible and contractable transmission which can be used between motor 51 and gear ring 46 is shown in FIG. 7. The chain teeth 48 of gear ring 46 are connected by an endless chain 49 to a chain wheel 50 which is driven by a stationary motor, but a pair of tensioning rollers 55 is spring-loaded to urge the two runs of chain 49 outwardly so that irrespective of the distance between the chain wheels 48 and 50, the chain is maintained in meshing engagement with chain wheels 48 and 50.

Figure 8:
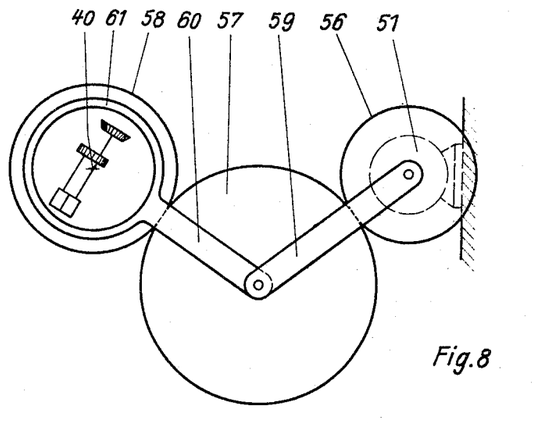
FIG. 8 is a plan view illustrating another embodiment of an expansible and contractable transmission.

In the modified transmission shown in FIG. 8, three gears 56, 57 and 58 are in meshing engagement. Gear 56 is secured to the shaft of a stationary motor 51, gear 58 is secured to gear ring 46, and gear 57 is mounted on a pivot means connecting two arms 59 and 60. Arm 59 is turnable about the shaft of motor 51, and arm 60 has a circular end portion 61 mounted on gear ring 46 for turning movement about axis 40. When gear ring 46 moves toward gear 56, the meshing engagement between gears 56, 57, 58 is maintained.

Irrespective of the construction of the expansible transmission connecting motor 51 with gear ring 46, motor 51 is preferably constructed as a known brake motor whose rotor is stopped by a brake as long as the motor is not energized. In this manner, gear ring 46 is prevented from rotating and maintained in a blocked position as long as no voltage is applied to motor 51. While rotation of gear ring 46 about axis 40 is blocked during the normal operation of the storing apparatus, it revolves about the axis 91 during rotation of the first rotary member 27, 28, 29.

A switch 67 on the top plate of the casing of the machine is provided for connecting motor 51 to a voltage source schematically indicated at 68.

It will be seen that in all embodiments of the invention, the flexible element 2 is first guided to a fixed guide means 92 located in the axis 91, then to a guide means 39 or 41' located in the axis 40, then to a guide means 41 or 41' located substantially in the axis 91, between transporting rollers 44 and 44', and then through a guide means 94 in the axis 91 and leading into the interior of the storing member 70.

During the normal operation of the storing apparatus, the storing apparatus 3 is driven from carding machine 1 over chain 6 so that drive shaft 12 drives shaft 19 through the engaged clutch 13 to 15, and 18 so that rotary motion is transmitted to the pair of bevel gears 23, shaft 24 and worm 25 to the outer rotary member 27, 28, 29. Since axis 40 of the inner rotary member 38 is eccentric, the inner rotary member 38, together with gear ring 46, revolves about axis 91. At the same time, gear ring 33 is rotated and transmits rotary motion to the inner rotary member 38 so that the same rotates about axis 40 while revolving about axis 91 with the outer rotary member 27, 28, 29.

Since gear ring 46 is blocked by motor 51 which is connected by transmission 50, 49 to gear ring 46, bevel gear 49 rolls on gear ring 46 and transmits its rotary motion through transmission 62 to 65 or 66 to the transporting rollers 44 whereby the flexible element 2 is transported through guide means 92, 39, 41, 94 or guide means 92, 43, 41' and 94 in the embodiment of FIG. 4. Due to the superimposed rotary motions of the two rotary members, the flexible element is inserted in the form of a helical coil into the lower end of the tubular storing member 70 and gradually raises the first and uppermost windings of the coil which, however, are transported away by transporting rollers 7, 8 and conveyer 4. The transporting speed of rollers 7 and 8 corresponds to the speed of conveyer 4 since rollers 7, 8 are driven from the drive means of conveyer 4 through a transmission including shafts and bevel gears 10.

The flexible element between rollers 5 of the carding device and stationary guide means 92 is sensed by feeler 16 so that the clutch 13 to 15, 18 is energized and engaged. If the flexible element 2 breaks in the sensed portion, for example due to a malfunction of the carding machine 1, contact means 17 opens, clutch 13 to 15 is disengaged, and brake member 18 is pressed by spring 21 against the stationary brake member 22. This stops the rotary members 29, 38 and thereby transporting rollers 44 or 44' so rapidly that the broken off end of the flexible element 2 may still be located below guide channel 42 or guide means 41'. When the proper function of the carding machine 1 is restored, the broken off end supplied by the carding machine is connected with the broken end hanging below the storing device so that the operation can be started again by placing feeler 16 on the tied flexible element 2.

However, if the flexible element 2 breaks so closely to transporting rollers 44 that the same transport the broken off end into the storing member 70, the separated ends of the flexible element must be connected by a different operation which is also carried out when the leading end of a new flexible element supplied by the carding machine is to be inserted into the guide means, transporting rollers and the lower end of the storing member 70.

Assuming that storing member 70 is empty, it is moved by means of slide 72, or turnable carrier 76 to a position in which its lower end is not located on the rotary members, see FIGS. 9 to 18, or is raised by the tubular slide 77 as described with reference to FIG. 15. When the storing member is thus placed in an inoperative position, the funnel-shaped guide means 94 of the inner rotary member 38 is freely accessible.

The free end of the flexible element is made pointed, and inserted into guide means 94 in the top plate 93 of the inner rotary member 38. Switch 67 is depressed so that motor 51 starts to rotate and drives through the transmissions 54 to 48 or 56 to 58, gear ring 46, while rotary members 38 and 27 to 29 are at a standstill. Motor 51 rotates gear ring 46 in such a direction of rotation that the bevel gear 49 which meshes with gear ring 46 is turned in a direction opposite to its normal direction of rotation whereby the transporting rollers 44 are also rotated in a direction opposite to the normal transporting direction so that the end of the flexible element is gripped by transporting rollers and transported into guide means 41 or 41' and out of the same. Switch 67 is held in actuated condition until a sufficient length of the flexible element appears below the table of storing apparatus 3. The end of the inserted length of the flexible element is connected with the end of the flexible element supplied by the carding machine whereupon storing member 70 is returned to its operative position about the rotary members, and the normal drive of the apparatus is started again by moving the clutch to the engaged position.

If storing member 70 is not empty, but the brakeage occurred so close to the transporting rollers that the broken off end was transported into the interior of the storing member 70, storing member 70 is not only moved away from the rotary members, but also tilted so that the operator can manually hold the coiled flexed element in storing member 70 and prevent dropping out of the stored coil. The operator finds the broken off end of the flexible element, and inserts the same into guide means 94, whereupon by operation of motor 51 the flexible element is transported into guide means 42 and 41' and finally manually connected to the broken end of the flexible element supplied by the carding machine.

In the construction illustrated in FIGS. 16 to 18, the cover member 74 is first moved to a position closing the lower open end of storing member 70. Thereupon, storing member 70 is moved away from the top surface of rotary members 29 and 38, and if necessary, the storing member is tilted to permit access to the lower end thereof so that the broken off end can be easily located. A transparent cover member 84 facilitates the finding of the broken off end of the flexible element. When storing member 70 is again in its operative position located above the rotary members, cover member 84 is moved to the open position shown in FIG. 17.

If the storing member is constructed as shown in FIG. 19, it is possible to find the broken off end of the flexible element by reaching between rods 90 into the interior of the storing member which eliminates the necessity of moving the storing member to a lateral or tilted position.

When the flexible element is threaded into the guide means in a direction opposite to its normal transporting direction during the storing operation, the end of the flexible element is inserted through guide opening 94 in the top plate 93 of the inner rotary member 38, and the reversed transporting rollers 44 directly deliver the end of the flexible element into the center of the upper guide opening 41 of channel 42 in FIG. 2, or into guide means 41' of FIG. 4, so that there is no danger of a jamming of the flexible element.

During the normal operation of the apparatus, the flexible element transported by transporting rollers 44 moves along the shortest possible distance, and is consequently drawn into the slot-like recess 69 in which it is somewhat compressed. Since the compression in the slot-like guide opening portion is only effective in a plane, it causes a flattening of the flexible element. Such flattening is compensated when transporting rollers are arranged as shown in FIG. 2 rotatable about axes transverse to the direction of the transverse extension of slot-like recess 69, whereby the flattened element is again rounded.

It will be understood that each of the elements described above, or two or more together, may also find a useful application in other types of storing apparatus for flexible elements differing from the types described above.

While the invention has been illustrated and described as embodied in a storing arrangement for a flexible element provided with means facilitating the connecting of the separated ends of a broken flexible element, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a storing device for a transported elongated flexible element, in combination, rotary support means having guide means for the elongated element; a hollow storing member for the elongated element having an open end located adjacent said rotary support means; rotary transporting means mounted on said rotary support means; drive means for rotating said rotary support means, and for rotating said transporting means in one direction for transporting the elongated element from a position below said rotary support means to a position located on said rotary support means in said storing member; means for stopping said drive means; and means for rotating said transporting means in a direction opposite to said direction of rotation whereby a broken end of the elongated element stored in said storing member can be moved by said transporting means to an accessible position located below said rotary support means while said drive means and rotary support means are stopped so that said broken end can be attached to the other broken end of the elongated element.

2. In a storing device for a transported elongated flexible element, in combination, rotary support means; a tubular storing member for the elongated element having an end located adjacent said rotary support means; rotary transporting means mounted on said rotary support means; drive means for rotating said rotary support means, and for rotating said transporting means in one direction for transporting the elongated element from a position below said rotary support means to a position located on said rotary support means in said storing member; first and second guide means mounted on said support means and disposed before and behind said transporting means, respectively, in said one direction for guiding the elongated element toward and away from said transporting means; means for stopping said drive means; and means for rotating said transporting means in a direction opposite to said direction of rotation whereby a broken end of the elongated element stored in said storing member can be moved by said transporting means into said first guide means to an accessible position located below said rotary support means while said drive means and rotary support means are stopped so that said broken end can be attached to the other broken end of the elongated element.

3. In a storing device for a transported elongated flexible element, in combinataion, a rotary support means; an upright tubular storing member for the elongated element having a lower end located adjacent said rotary support means; mounting means for mounting said storing member for movement between an operative position in which said lower end is located on said rotary support means, and an inoperative position in which said lower end is spaced from said rotary support means; rotary transporting means mounted on said rotary support means; drive means for rotating said rotary support means, and for rotating said transporting means in one direction for transporting the elongated element from a position below said rotary support means to a position located on said rotary support means in said storing member; first and second guide means mounted on said support means and disposed before and behind said transporting means, respectively, in said one direction for guilding the elongated element toward and away from said transporting means so that a broken end may be inserted into said second guide means and supplied to said transporting means in said inoperative position of said storing member; means for stopping said drive means; and means for rotating said transporting means in a direction opposite to said direction of rotation whereby the broken end of the elongated element stored in said storing member and inserted into said first guide means can be moved by said transporting means into said first guide means to an accessible position located below said rotary support means while said drive means and rotary support means are stopped so that said broken end can be attached to the other broken end of the elongated element.

4. In a storing device for a transported elongated flexible element, in combination, rotary support means; a tubular storing member for the elongated element having an end located adjacent said rotary support means; rotary transporting means mounted on said rotary support means; drive means for rotating said rotary support means, and for rotating said transporting means in one direction for transporting the elongated element from a position below said rotary support means to a position located on said rotary support means in said storing member; first and second guide means mounted on said support means and disposed before and behind said transporting means, respectively, in said one direction for guiding the elongated element toward and away from said transporting means; means for stopping said drive means; and motor means for rotating said transporting means in a direction opposite to said direction of rotation whereby a broken end of the elongated element stored in said storing member can be moved by said motor and said transporting means into said first guide means to an accessible position located below said rotary support means while said drive means and rotary support means are stopped so that said broken end can be attached to the other broken end of the elongated element.

5. In a storing device for a transported elongated flexible element, in combination, rotary support means having guide means for the elongated element; an upright tubular storing member for the elongated element having a lower end located adjacent said rotary support means; rotary transporting means mounted on said rotary support means; supply means for supplying the elongated element from a position below said rotary support means to said rotary transporting means; drive means for rotating said rotary support means, and for rotating said transporting means in one direction for transporting the elongated element from a position below said rotary support means to a position located on said rotary support means in said storing member; means for stopping said drive means including a feeler means for sensing said elongated element between said supply means and said transporting means, and means controlled by said feeler means to stop said drive means when said elongated element breaks; and means for rotating said transporting means in a direction opposite to said direction of rotation whereby the broken end of the elongated element stored in said storing member can be moved by said transporting means to an accessible position located below said rotary support means while said drive means and rotary support means are stopped so that said broken end can be attached to the other broken end of the elongated element.

6. In a storing device for a transported elongated flexible element, in combination, rotary support means having guide means for the elongated element; and upright tubular storing member for the elongated element having a lower end located adjacent said rotary support means; rotary transporting means mounted on said rotary support means; supply means for supplying the elongated element from a position below said rotary support means to said rotary transporting means; drive means for rotating said rotary support means, and for rotating said transporting means in one direction for transporting the elongated element from a position below said rotary support means to a position located on said rotary support means in said storing member, said drive means including drive shaft means having two shafts, and a clutch between said shafts operable between a coupling position and a disengaged position, one of said shafts driving said rotary support means; means for stopping said drive means including a feeler means for sensing said elongated element between said supply means and said transporting means, and means controlled by said feeler means to move said clutch to said disengaged position when said elongated element breaks; and means for rotating said transporting means in a direction opposite to said direction of rotation whereby the broken end of the elongated element stored in said storing member can be moved by said transporting means to an accessible position located below said rotary support means while said drive means and rotary support means are stopping so that said broken end can be attached to the other broken end of the elongated element.

7. In a storing device for a transported elongated flexible element, in combination, rotary support means; an upright tubular storing member for the elongated element having a lower end located adjacent said rotary support means; mounting means for mounting said storing member for movement between an operative position in which said lower end is located on said rotary support means, and an inoperative position in which said lower end is spaced from said rotary support means; rotary transporting means mounted on said rotary support means; supply means for supplying the elongate element from a position below said rotary support means to said rotary transporting means; drive means for rotating said rotary support means, and for rotating said transporting means in one direction for transporting the elongated element from a position below said rotary support means to a position located on said rotary support means in said storing member, said drive means including drive shaft means having two shafts, and a clutch between said shafts operable between a coupling position and a disengaged position, one of said shafts driving said rotary support means; first and second guide means mounted on said support means and disposed before and behind said transporting means, respectively, in said one direction for guiding the elongated element toward and away from said transporting means so that a broken end may be inserted into said second guide means and supplied to said transporting means in said inoperative position of said storing member; means for stopping said drive means including a feeler means for sensing said elongated element between said supply means and said transporting means, and means controlled by said feeler means to move said clutch to said disengaged position when said elongated element breaks; and means for rotating said transporting means in a direction opposite to said direction of rotation whereby the broken end of the elongated element stored in said storing member and inserted into said first guide means can be moved by said transporting means into said first guide means to an accessible position located below said rotary support means while said drive means and rotary support means are stopped so that said broken end can be attached to the other broken end of the elongated element.

8. In a storing device for a transporting elongated flexible element, in combination, rotary support means; an upright tubular storing member for the elongated element having a lower end located adjacent said rotary support means; mounting means for mounting said storing member for movement between an operative position in which said lower end is located on said rotary support means, and an inoperative position in which said lower end is spaced from said rotary support means; rotary transporting means mounted on said rotary support means; supply means for supplying the elongated element from a position below said rotary support means to said rotary transporting means; drive means for rotating said rotary support means, and for rotating said transporting means in one direction for transporting the elongated element from a position below said rotary support means to a position located on said rotary support means in said storing member, said drive means including drive shaft means having two shafts, and a clutch between said shafts operable between a coupling position and a disengaged position, one of said shafts driving said rotary support means; brake means controlled by said clutch in said disengaged position to brake said one shaft portion and said rotary support means; first and second guide means mounted on said support means and disposed before and behind said transporting means, respectively, in said one direction for guiding the elongated element toward and away from said transporting means so that a broken end may be inserted into said second guide means and supplied to said transporting means in said inoperative position of said storing member; means for stopping said drive means including a feeler means for sensing said elongated element between said supply means and said transporting means, and means controlled by said feeler means to move said clutch to said disengaged position when said elongated element breaks; and motor means for rotating said transporting means in a direction opposite to said direction of rotation whereby the broken end of the elongated element stored in said storing member and inserted into said first guide means can be moved by said motor and said transporting means into said first guide means to an accessible position located below said rotary support means while said drive means and rotary support means are stopped so that said broken end can be attached to the other broken end of the elongated element.

9. An apparatus as set forth in claim 3 wherein said mounting means includes a vertical supporting shaft for mounting said storing member for movement about the axis of said supporting shaft between said operative and inoperative positions.

10. An apparatus as set forth in claim 3 wherein said mounting means includes a shaft extending transverse to the axis of said tubular storing member and supporting the same for angular movement between said operative and inoperative positions.

11. An apparatus as set forth in claim 3 wherein said mounting means includes a vertical shaft means supporting said storing member for translatory movement toward said rotary support means to said operative position, and away from the same to said inoperative position.

12. An apparatus as set forth in claim 3 and including weight means for counterbalancing said storing member during movement between said operative and inoperative position.

13. An apparatus as set forth in claim 3 and including means mounting said storing member for turning movement to a tilted position in which the lower end thereof is accessible while the same is in said inoperative position.

14. An apparatus as set forth in claim 3 wherein said storing member includes a cover member having a normal position spaced from said lower end, and being manually operable to move to a position closing said lower end of said storing member, and adapted to be moved to said closed position when said storing member is in said operative position and before the same is moved to said inoperative position.

15. An apparatus as set forth in claim 14 wherein said cover member is made of a transparent material.

16. An apparatus as set forth in claim 14 wherein said cover member has a plurality of slots permitting in said closed position passage of said flexible element.

17. An apparatus as set forth in claim 1 wherein said hollow storing member includes a pair of upper and lower rings, and a plurality of rods connecting said rings and secured to circumferentially spaced points of the same whereby the elongated element stored in said storing member and a broken end of said element are accessible.

18. An apparatus as set forth in claim 6 and including means for rotating said transporting means in a direction of rotation opposite to the transporting direction of rotation while said clutch is in said disengaged position.

19. An apparatus as set forth in claim 8 wherein said motor means includes an electric motor, and including a switch for starting said motor while said clutch is disengaged, and said rotary support means are at a standstill.

20. In a storing device for a transported elongated flexible element, in combination, rotary support means including an outer rotary member mounted for rotation about a first axis, and an inner rotary member mounted on said first rotary member for rotation about a second axis parallel with said first axis, said inner rotary member having guide means for the elongated element; a tubular storing member for the elongated element having an end located adjacent said rotary support means; transporting roller means mounted on said inner rotary member; transmission means connecting said outer and inner rotary member with said transporting roller means; drive means including a clutch operable between an engaged position and a disengaged position, and connected with one of said rotary members so that said outer and inner rotary members and said transporting roller means rotate simultaneously while said transporting roller means transport the elongated element through said guide means into said storing member; means for moving said clutch between said engaged and disengaged position; a motor; and means for establishing a driving connection between said motor and said transporting roller means while said clutch is in said disengaged position, and being arranged and constructed to permit relative movement between said transporting roller means and said inner rotary member on one hand and said motor on the other hand while said inner rotary member revolves about said first axis and said motor is at a standstill.

21. An apparatus as set forth in claim 4 wherein said rotary support means include an outer rotary member rotatable about a first axis, and an inner rotary member rotatable about a second axis eccentric to said first axis and revolving about said first axis during rotation of said outer rotary member; transmission means connecting said motor means with said inner rotary member; and means mounting said motor means for movement with said inner rotary member while the same revolves about said first axis.

22. An apparatus as set forth in claim 4 wherein said rotary support means include an outer rotary member rotatable about a first axis, and an inner rotary member rotatable about a second axis eccentric to said first axis; and including an expansible and contractable transmission comprising gears connected for rotation with said inner rotary member and said motor means, and a pair of arms connected with said gears, and a pivot means connecting said arms and supporting another gear meshing with said first mentioned gears.

23. An apparatus as set forth in claim 4 wherein said rotary support means include an outer rotary member rotatable about a first axis, and an inner rotary member rotatable about a second axis eccentric to said first axis, and including an expansible and contractable transmission connecting said inner rotary member with said motor, said transmission including chain wheels connected for rotation with said inner rotary member and with said motor means, respectively, a chain passing over said chain wheels, and spring-loaded tensioning rollers acting on said chain to hold the same in tensioned condition while said rotary inner member and the correlated chain wheel move toward the other chain wheel and said motor means.

24. An apparatus as set forth in claim 4 wherein said rotary support means include an outer rotary member rotatable about a first axis, and an inner rotary member rotatable about a second axis eccentric to said first axis; wherein said motor means has a flexible motor shaft; and transmission means connecting said flexible motor shaft with said inner rotary member.

25. An apparatus as set forth in claim 2 wherein said first guide means includes a channel-shaped tubular guide member having at one end adjacent said transporting means a guide opening formed with a transverse slot-shaped portion whose transverse extension increases in the transporting direction of the flexible element toward said transporting means, and whose transverse width is reduced in said transporting direction.

26. An apparatus as set forth in claim 2 wherein said first guide means has a guide opening with a transverse portion whose width decreases in the transporting direction in which said flexible element is transported by said transporting means.

27. A method for connecting separated ends of a broken flexible element which is normally continuously transported by transporting means into a tubular storing member while passing through guide means of a rotary support at one end of the tubular storing member, comprising the steps of stopping said support and the transporting means for the flexible element; moving the storing member to a position spaced from the rotary support so that the guide means in the latter and the broken end of the flexible element in the storing member are accessible; operating the transporting means in a reversed direction so that the broken end is transported into said guide means and to an accessible position; and connecting the separated broken ends of the flexible element.

References Cited by the Examiner

UNITED STATES PATENTS 3,218,677  11/1965  Denis et al. __________ 19—159

MERVIN STEIN, *Primary Examiner.*

I. C. WADDEY, *Assistant Examiner.*